United States Patent Office 3,782,997
Patented Jan. 1, 1974

3,782,997
METHOD FOR SEALING ANODIZED BERYLLIUM COMPONENTS TO IMPROVE DIELECTRIC AND CORROSION RESISTANT PROPERTIES
Daniel G. Daly, New York, N.Y., and Gerardo A. Ritacco, Belleville, N.J., assignors to The Bendix Corporation
No Drawing. Filed Dec. 14, 1970, Ser. No. 98,084
Int. Cl. B44d 1/34
U.S. Cl. 117—49        7 Claims

ABSTRACT OF THE DISCLOSURE

Anodized beryllium components are cleaned and baked and then impregnated with a suitable dielectric material after which the components are cured for sealing existing porosity and for thereby improving dielectric and corrosion resistant properties of the components.

BACKGROUND OF THE INVENTION

Field of the invention

This invention relates to a method for improving dielectric and corrosion resistant properties of anodized beryllium components and, more particularly to accomplishing the above by impregnating said components with an appropriate agent to seal existing porosity.

Description of the prior art

Prior to the space age, beryllium was a little used metal, but now because of the particular physical properties of the metal, beryllium components are an integral part of space craft guidance systems.

In order to improve dielectric and corrosion resistant properties of these components the beryllium has been anodized. However, a particular characteristic of the anodized coating when applied to beryllium is that it possesses ionic permeability—a condition which produces a porous surface. This condition is a detriment when the component is to be used in a dielectric capacity, because under humid conditions sufficient moisture is absorbed and retained to cause dielectric failure and hasten corrosion.

Prior to the present invention there has not been a suitable method, adaptable to production techniques, which has provided considerable improved dielectric and corrosion resistant characteristics of anodized beryllium components.

SUMMARY OF THE INVENTION

This invention contemplates a method whereby anodized beryllium components are cleaned and then baked for moisture removal, first at atmospheric pressure and then under a vacuum. The parts are next heated and impregnated with a dielectric resin, first under a vacuum and then under pressure, after which they are heated and wiped to remove excess impregnating material. Finally, the impregnated components are heated and subjected to pressure for curing.

One object of this invention is to improve the dielectric and corrosion resistant properties of anodized beryllium components.

Another object of this invention is to accomplish the above by sealing the porosity of the anodized coating with an appropriate dielectric agent.

Another object of this invention is to deter absorption of moisture which causes dielectric failure and hastens corrosion.

The foregoing and other objects and advantages of the invention will appear more fully hereinafter from a consideration of the detailed description which follows.

DESCRIPTION OF THE INVENTION

The components to be treated by the method of the present invention are of commercially available beryllium stock and have been previously anodized, typically in a chromic acid electrolyte by methods well known in the art so that an anodized coating approximately .0004 inch in thickness is obtained.

Prior to impregnation, the parts are cleaned thoroughly, first ultrasonically in, for example trichlorotrifluoroethane for about 2 minutes and then vapor rinsed in the same cleaning agent for an additional 2 minutes, after which the parts are checked for foreign matter under the authority of a 20× magnification microscope and re-cleaned if contamination still exists. It is to be noted that contamination of all sorts must be kept off the parts to achieve the maximum dielectric and anti-corrosive results desired, and to this end extreme care should be exercised in handling the parts to the extent that finger cots or protective gloves are to be used.

The cleaned components are baked at 250° F. for two hours in a normal atmosphere after which they are loaded in an appropriate impregnating fixture and heated to 200° F. under a vacuum of about 50 microns for four hours to insure removal of all residual moisture. The fixtured parts are then cooled to a temperature of 160° F.

Although the impregnating fixture may take many shapes and sizes, depending on the parts involved, in essence it need be nothing more than a pot-like vessel with a cover suitably sealed by an O-ring, for example, and with orifices so that vacuum may be drawn and pressure exerted. Also, the fixture should have venting means for purposes that will hereinafter be evident. The parts may be placed in spaced relation in the bottom of the pot or on a crucible resting therein.

An impregnating agent prepared as will be hereinafter described is poured into the fixture so that the parts are covered with about ½ inch of the sealant, after which the sealant and parts are degassed by drawing a vacuum of about 50 microns for 30 minutes.

After degassing, pressure of about 100 p.s.i.±5 p.s.i. is applied for 15–20 minutes to accomplish the sealing, with the fixture then being vented to the atmosphere.

The parts are removed from the fixture and wiped to remove residual impregnating material and heated to 212° F. for bleeding out excess material after which they are again wiped. The bleeding process is continued until all excess material is removed. An alternative method of removing impregnating material is to rinse the components in a solvent such as methyl ethyl ketone after bleeding out excess material by heating as above.

The parts are loaded into a suitable pressure vessel, which may be the impregnating fixture after it has been cleaned, and subjected to a pressure of 100 p.s.i. and cured for 12 hours at this pressure and at 160° F. The temperature is raised to 212° F. and the pressurized parts are further cured at the raised temperature for an additional 8 hours.

While various materials may be used as a sealant, the following epoxy resin compositions are listed, by way of illustration, as being suitable for the purposes of the invention.

| Material | Epoxy equivalent 172–178 | Epoxy equivalent 135–195 |
|---|---|---|
| Viscosity | 4,000–6,000 centipoises at 25° C. | 135–195 poises at 25° C. |
| Activator | Piperdine | Succinic anhydride |

Other resins of different molecular structure may be used with the method of the invention such as those of the polyester and polyurethane families. Materials which do not require an activator but which may be otherwise solidified in place may also be used.

Typical quantities of resin for production type runs of small beryllium parts when using epoxy equivalent 172–178 with piperdine activator may be 100 grams of resin mixed with 10 grams of activator, or a ratio of 10 to 1 resin to activator.

The mixed material may be allowed to stand at room temperature until a consistency for ease in application is obtained, after which the material is remixed and degassed by heating at a temperature of 160° F. and under a vacuum of 50 microns, for example, for approximately 5 minutes, or until bubbling of the mixture stops, after which the hot sealant is poured into the impregnating fixture as heretofore noted.

The method of the invention as herein described satisfies a long standing need for a successful and economical method for improving dielectric and corrosion resistant properties of anodized beryllium components. The inherent porous conditions caused by the anodizing is eliminated and the aforenoted properties of the parts are considerably improved to make them suitable for critical application such as in the aerospace field.

Although but a single embodiment of the invention has been illustrated and described in detail, it is to be expressly understood that the invention is not limited thereto. Various changes may also be made in the design and arrangement of the steps of the method without departing from the spirit and scope of the invention as the same will now be understood by those skilled in the art.

What is claimed is:

1. A method for sealing anodized beryllium components to improve dielectric and corrosion resistant properties, comprising:
   cleaning the components including cleaning the components ultrasonically in a suitable solvent, vapor rinsing the components in the solvent, baking the components at normal pressure and at a first temperature, and baking the parts in a vacuum of approximately 50 microns and at a second temperature lower than said first temperature;
   applying liquid sealant to the components, said sealant being curable with pressure and temperature;
   subjecting the components with the sealant applied to a vacuum of approximately 50 microns for an interval of approximately 30 seconds for degassing;
   subjecting the components to pressure for accomplishing the sealing;
   removing excess sealant from the components; and
   subjecting the components to temperature and pressure for curing the sealant including heating the components to a first temperature and at a predetermined pressure for a predetermined first interval and heating the components to a second higher temperature while maintaining the predetermined pressure for a second interval.

2. A method as described by claim 1, wherein after baking the components in a vacuum and at a second temperature lower than said first temperature the step of cooling the parts to a third temperature lower than said first and second temperatures is performed.

3. A method as described by claim 1, wherein the step of applying sealant to the components includes:
   heating the components;
   heating the sealant in a vacuum for degassing; and
   pouring the hot, degassed sealant over the components for covering the components with sealant.

4. A method as described by claim 1, where the step of subjecting the components to pressure for accomplishing the sealing includes:
   subjecting the parts to a pressure of approximately 100 p.s.i. for an interval of from 15 to 20 minutes.

5. A method as described by claim 1, wherein the first temperature is approximately 160° F.;
   the predetermined pressure is approximately 100 p.s.i.;
   the second temperature is approximately 212° F.;
   the first interval is approximately 12 hours; and
   the second interval is approximately 8 hours.

6. A method as described by claim 2, wherein the first temperature is approximately 250° F., the second temperature is approximately 200° F.; and the third temperature is approximately 160° F.

7. A method as described by claim 3, wherein:
   the components are heated to approximately 200° F.; and
   the sealant is heated to approximately 160° F. under a vacuum of approximately 50 microns.

References Cited

UNITED STATES PATENTS

| Number | Date | Name | Class |
|---|---|---|---|
| 3,276,974 | 10/1966 | Tyson | 204—56 X |
| 3,418,219 | 12/1968 | Fahlbusch | 204—38 |
| 3,414,489 | 12/1968 | Rogers | 204—38 |
| 1,877,208 | 9/1932 | Van Dusen et al. | 204—38 |
| 3,016,293 | 1/1962 | Cybriwsky et al. | 117—49 X |
| 2,763,570 | 9/1956 | Shepard et al. | 117—61 X |
| 3,123,493 | 3/1964 | Brick | 117—61 X |
| 3,037,886 | 6/1962 | Ruznar | 117—49 X |

FOREIGN PATENTS

| Number | Date | Country | Class |
|---|---|---|---|
| 1,016,773 | 1/1966 | Great Britain | 204—38 |
| 639,090 | 6/1950 | Great Britain | 204—38 |

WILLIAM D. MARTIN, Primary Examiner

M. R. LUSIGNAN, Assistant Examiner

U.S. Cl. X.R.

117—65.2, 119, 161 ZB; 204—35 N, 38 A